Dec. 6, 1955          T. J. SCULLY          2,726,363
CONTROL SYSTEM FOR MOTOR DRIVEN DEVICE
Filed June 4, 1953          2 Sheets-Sheet 1
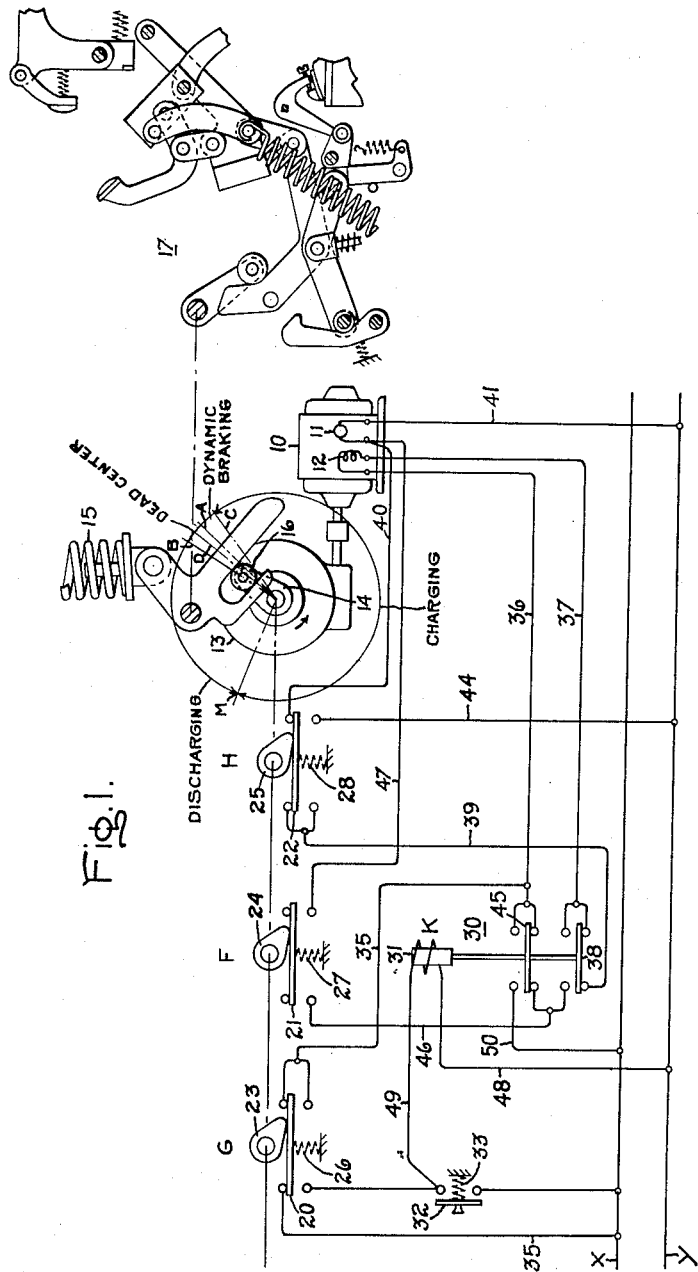
Inventor:
Thomas J. Scully,
by J. Wesley Vauber
His Attorney.

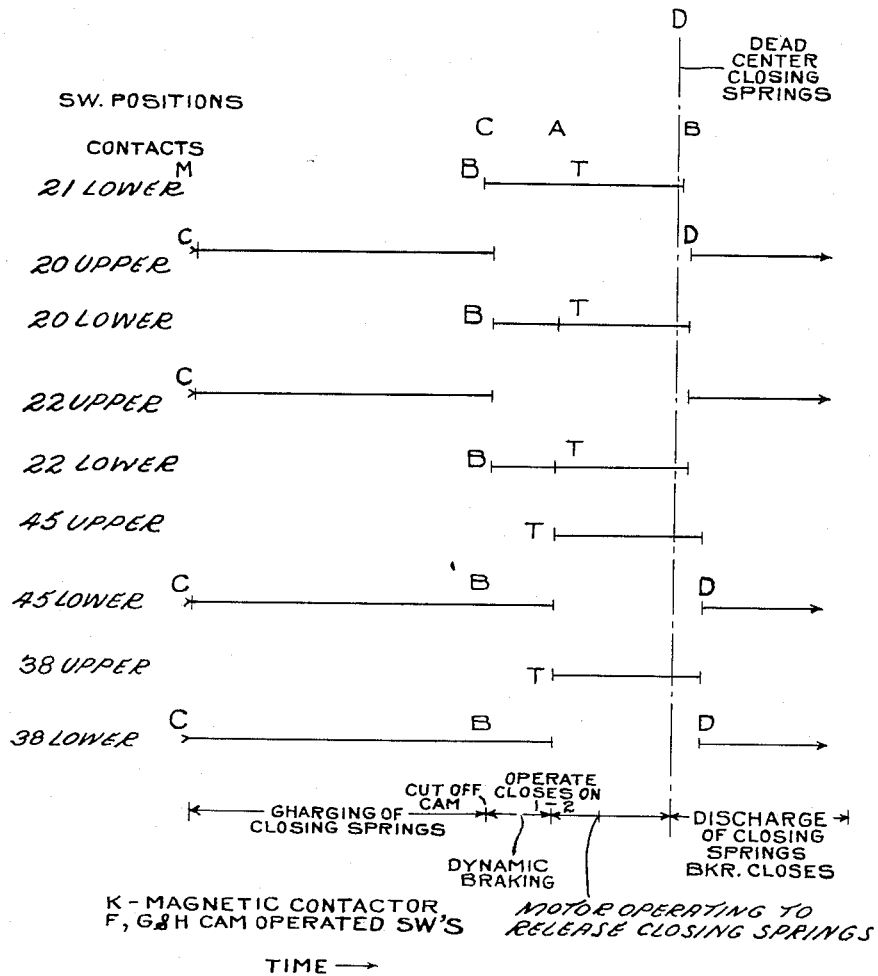

United States Patent Office 2,726,363
Patented Dec. 6, 1955

2,726,363

CONTROL SYSTEM FOR MOTOR DRIVEN DEVICE

Thomas J. Scully, Bridgeport, Pa., assignor to General Electric Company, a corporation of New York Application June 4, 1953, Serial No. 359,609

10 Claims. (Cl. 318—275)

The invention relates to the control of electric motor driven devices, particularly of the cycling type wherein the motor is to be stopped by dynamic braking action when each operating cycle is completed so that a rotatable element of the driven device will come to rest in a desired angular position.

The principal object is to provide an improved switching control system for enabling an electric driving motor to perform two successive motoring functions and a final dynamic braking function during each operating cycle of the driven device, each motoring function being selectively controlled and the dynamic braking function being automatically controlled to insure accurate stopping of a movable element of the motor driven device in a desired position.

The selective successive motoring and automatic dynamic braking motor control switching improvements of the present invention are of particular advantage in controlling an energy storing motor driven operating device having an overrunning rotatable cam element for closing a circuit breaker when the element is driven through a dead center position as disclosed and claimed in application Serial No. 196,075, now Patent No. 2,667,076, filed November 16, 1950, by John A. Favre and assigned to the assignee of the present invention. However, the improved cycling motor control switching system of the present invention may be of equal advantage in other similar motor controlling service.

In the energy storing overrunning type of motor driven operating device referred to above, the energy accumulator in the form of a powerful spring is charged when the driving motor rotates the operating cam element to an angular position somewhat short of a dead center position wherein the energy accumulating spring is held charged by the cam element. Upon re-energizing the motor to drive the rotatable cam element through the dead center position, the energy stored in the springs is suddenly released by the overrunning of the element to perform the desired circuit breaker closing operation. In this way, a very large operating force can be stored by energizing a relatively small electric driving motor and readily released simply by reenergizing the motor just sufficiently to drive the element over center to effect the closing of the circuit breaker.

In such service it is desirable to control the driving motor so as to interpose a dynamic braking of the motor between the motoring operation required to charge the energy storing springs and the motoring operation required to release the energy stored in the springs. This braking action will minimize the time required for the driving motor to drive the rotatable element through the dead center position to effect the release of the stored energy since the driving motor can be accurately stopped by dynamic braking action under all operating conditions when the rotatable element reaches an angular position as close as practicable to its dead center position without coasting over center.

Hence another object of the present invention is to provide an improved driving motor cycling control system wherein the main control switch is selectively operable from one position to another position to initiate a limited motoring operation, such for example as required to drive the rotatable element over center, and returned to the one position to produce a second limited motoring operation, such for example as required to recharge the energy accumulating springs and then a dynamic braking action of the motor is automatically produced for accurately stopping the motor at the end of the second limited motoring operation thereof.

Another object is to provide an improved driving motor cyclic control switching system that will initiate only a single cycle of operation of the driven device for each operation of a resettable switch that initiates the operation of the device and thereby prevent "pumping" in case the initiating control switch should not be reset but is maintained in its operated position. Without such "antipumping" feature, the operating cycle may be repeated indefinitely as long as the initiating switch is maintained in its operated position.

Further objects and advantages of the invention will appear from the following description of the accompanying drawing in which Fig. 1 is a schematic circuit diagram of the improved cyclic motor control and dynamic braking system of the present invention applied to the driving motor of an energy storing device for closing a heavy duty circuit breaker; and Fig. 2 is a sequence diagram showing the closing periods of each control switch during each operating cycle.

As shown in the drawing, the electric driving motor 10 is of the usual series type having an armature winding 11 and a series field winding 12 suitable for energization from either an alternating or direct current source. The motor 10 is connected to drive an energy storing overrunning operating device 13 of the type disclosed in the Favre patent application noted above. In this device, as schematically shown, the rotatable cam element 14 in the form of a crank arm and roller is driven through the overrunning drive mechanism 13 by the motor 10 to store energy in the spring 15. The stored energy is quickly released when the rotatable cam element 14 is driven through a dead center position indicated as D in Figs. 1 and 2 so as to overrun the driving motor. In this way, the stored energy of spring 15 is applied to roller 16 to quickly and positively close the circuit breaker 17 which may be of the improved type described and claimed in application Serial No. 137,411, now Patent No. 2,581,181, filed January 7, 1950, by John A. Favre and assigned to the assignee of the present invention.

As shown in the drawing, the improved cyclic motor control system of the present invention initially energizes motor 10 to drive the rotatable cam element 14 counterclockwise through a limited energy relasing part of each cycle shown as extending from an angular position A (which is the normal rest position of the operating cycle and which is shown in Figs. 1 and 2 as somewhat short of the dead center position D) to a second angular position B which is sufficiently over center to insure the discharge of the energy stored in spring 15 to close the circuit breaker. During this resulting discharge of the stored energy, the overrunning drive mechanism 13 enables the cam 14 to overrun the motor 10 through the spring releasing or discharging part of the cycle indicated in Fig. 1 and thereby produce a quick closing of the circuit breaker. After the end of the energy discharging part of the cycle at point M, the improved control system enables the motor 10 to be energized to drive element 14 to recharge the spring 15 during the charging part of each cycle as indicated in Fig. 1. The improved control system then insures that as soon as the rotatable cam element 14 reaches the angular position C the armature windings 11 and series field windings 12 of motor 10 are interconnected in a dynamic braking circuit in order to stop the motor at the end of the dynamic braking part of the cycle when the cam element 14 is returned to its initial angular position A.

In order to control the successive motoring operations and final dynamic braking action as just described, the revolving cam element 14 is connected to cyclically operate a plurality of control switches 20, 21 and 22 by means of suitable cams indicated schematically in the drawing as 23, 24 and 25 which cooperate with the springs 26, 27 and 28 to produce a quick operation of each switch member 20, 21 and 22 to its upper position in which it is shown when the angular position B of cam element 14 is reached and to produce a quick operation of each switch member to its opposite or lower circuit controlling position when the angular position C of cam element 14 is reached.

In accordance with the present invention the cam operated control switches 20, 21 and 22 are electrically interconnected with a separately operable two position multicontact selective control switch indicated generally by the reference character 30 in order to initiate the operation of motor 10 when the switch 30 is selectively operated from the biased position in which it is shown to its other circuit controlling position and to continue the motoring operation when the switch 30 is returned to the position in which it is shown and also establish the dynamic braking connections for motor 10 with the switch 30 in the position in which it is shown.

The selectively operable control switch 30 is suitably biased to the position in which it is shown and is operated to its other circuit controlling position by means of the electromagnet 31 which is energized upon operation of the manual pushbutton 32 that is automatically reset to the open position by the spring 33. The novel manner in which the control switches 20, 21 and 22 cooperate with the electro-responsive switch 30 in controlling motor 10 will become apparent from the following description of the various parts of the operating cycle.

*Operation*

As shown in Fig. 1 of the drawing, the motor 10 is in an intermediate part of its operating cycle, since it has just been energized by means of the pushbutton 32 to drive the rotatable cam element 14 to its over center angular position B wherein the cam switches 20, 21 and 22 are operated to their upper or biased position by means of the biasing springs 26, 27 and 28. Also the switch 30 has just been returned to its biased or deenergized position due to the opening of pushbutton switch 32. These two actions automatically establish a new energizing circuit for the motor 10 through a circuit extending from the X supply line through conductor 35, switch 20 in its biased position, conductor 35, conductor 36, the series field winding 12 of motor 10, conductor 37, contact 38 of the two position switch 30, conductor 39, switch 22 in its biased position, conductor 40, the armature 11 and conductor 41 to the other supply line Y. In this way, the motor 10 becomes energized to drive the cam element 14 through the discharging part of the cycle even though this element can freely overrun motor 10 during this discharge part of the cyle in order to effect a quick discharge of the energy stored in the spring 15.

Such overrunning of the motor 10 by the cam element 14 under the strong propelling force of spring 15 may, due to the inertia of the parts, carry the cam element 14 somewhat past the angular position M indicated in Fig. 1 and thereby effect some recharging of spring 15. In position M the spring pressed slotted bell crank can exert only a purely radially outward force on the cam arm 14 so that this position represents the dead center of cam 14 under the propelling force of spring 15. But whereever the element 14 ceases to overrun the motor, the energized motor 10 immediately becomes effective to drive element 14 due to the clutch action. Thus the energized motor 10 can become effective to drive the cam element 14 either during the spring discharge part of the cycle or during the spring charging part of the cycle, and then continue to drive cam element 14 to produce recharging of spring 15 until cam element 14 reaches the angular position C.

When element 14 reaches angular position C, motor 10 is automatically de-energized and the motor dynamic braking connections are closed in the following manner. As indicated in the sequence diagram of Fig. 2, the switches 20, 21 and 22 are operated by the cam 23, 24, 25 to their lower circuit controlling positions opposite that in which they are shown in Fig. 1. This not only de-energizes the motor 10 but establishes the motor dynamic braking connections which may be traced as follows. From supply line Y through conductor 44 switch 22 in its lower position, conductor 39, contact 38, conductor 37, the series field 12, conductor 36, contact 45 of switch 30, conductor 46, contact 21 in its lower position, conductor 47, the motor armature 11 and conductor 41 to the supply line Y thus completing a closed loop dynamic braking circuit. In this circuit the series field 12 is reversed with respect to armature 11 so as to produce the dynamic braking action that will accurately stop the motor 10 when the cam element 14 is returned to an angular position A which is as close as practical to the dead center angular position D without overrunning this dead center position. In position A, the rotatable cam element 14 serves to hold the spring 15 charged until it is desired to again close the circuit breaker 17.

It will be understood that this position A is the normal rest position of the operating cycle.

All that is required to release the energy stored in spring 15 to close the circuit breaker 17 is to re-energize motor 10 so as to drive the cam element 14 over center. This is accomplished when the manually operable pushbutton 32 is operated to energize the electromagnet 31 from lines X and Y through conductors 48 and 49 and thereby operate the switch 30 from its biased position in which it is shown to its energized position. A holding circuit for maintaining electromagnet 31 energized is established through conductor 48, electromagnet 31, conductor 49, switch 20 in its lower position, conductor 35, contact 45 in its upper position and conductor 50. At the same time an energizing circuit for motor 10 is established to initiate a limited motoring operation thereof until the rotatable cam element 14 is driven over center to the angular position B. This initial circuit for energizing motor 10 may be traced from supply line X through conductor 50, contact 45 in the energized position of switch 30, conductor 36, the series field winding 12, conductor 37, and contact 38 in the energized position of switch 30, conductor 46, cam switch 21 in its lower position, conductor 47, the armature 11 and conductor 41 to the supply line Y. As soon as cam element 14 reaches the angular position B, cam switches 20, 21 and 22 are returned to their biased position in which they are shown in Fig. 1 as indicated in the sequence diagram of Fig. 2, provided the pushbutton 32 has been released, so that switch 30 is reset to its biased position when the holding circuit of electromagnet 31 is opened by the return of switch 20 to the biased position. Thereupon, the energizing circuit for the motor 10 will again be transferred to that initially described, thereby to continue the motoring operation thereof until the cam element 14 is driven through the charging part of the cycle and angular position C is reached and the dynamic braking connections are established in the manner previously described.

In the event that the pushbutton 32 should be maintained closed, then the operating electromagnet 31 will be maintained energized and switch 30 will not be returned or reset to its biased position in which it is shown. Consequently, when the angular position B is reached by element 14 to effect the discharge of the energy stored in spring 15, the successive or continued motoring operation will be prevented until the pushbutton 32 is released so as to permit switch 30 to return to its reset position. In this way the improved cycling motor control system of the present invention effectively insures against "pumping" which otherwise might result in continuous driving of the rotatable element 14 through its cycle as long as the pushbutton 32 is maintained closed. Such repeated release of the energy stored in the spring 15 and recharging thereof would accomplish no useful purpose since the breaker is already closed.

Due to the provision for dynamic braking to stop motor 10, the time required to effect the release of the energy stored in spring 15 is reduced to a minimum and furthermore, this time is maintained substantially constant under all normal operating conditions which is difficult if not impossible to accomplish in any other way. Such minimum closing time for the circuit breaker is of particular importance in case the manual pushbutton 32 should be replaced by an automatic resettable control switch of the type such as might be used in automatic circuit breaker reclosing systems or generator synchronizing apparatus or in other similar automatic circuit breaker control service.

What I claim as new and desire to secure by Letters Patent of the United States is:

1. A cyclic motor control system having in combination an electric motor provided with dynamic braking connections closable to stop said motor, a plurality of control switches operated during each cycle by the motor, means including a selective switch having two circuit controlling positions and connections in one of said positions with one of said control switches for closing the dynamic braking connections to stop the motor when each cycle is completed, said selective switch having connections in the other of said positions with another of said control switches for energizing the motor to effect a limited motoring operation thereof during the initial part of each cycle, and said selective switch having connections in said one of said positions with another of said control switches for energizing the motor to continue motoring operation thereof during the intermediate part of each cycle.

2. A cyclic motor control system having in combination an electric motor having a dynamic braking circuit, a plurality of control switches having a rotatable operating element driven by the motor, means including a selective switch having two circuit controlling positions and connections in one of said positions with one of said control switches for rendering the dynamic braking circuit operative to stop the motor when the element reaches one angular position, said selective switch having connections in the other of said positions with another of said control switches for energizing the motor to effect motoring operation thereof until the element reaches another angular position, and said selective switch having connections in said one of said positions with another of said control switches for energizing the motor to effect motoring operation thereof until the element returns to said one angular position.

3. A motor control system having in combination an electric motor having a dynamic braking circuit, a plurality of control switches operated by the motor, means including an electroresponsive switch connected to be de-energized by one of said control switches and provided with connections in the de-energized position with another of said control switches for rendering the dynamic braking circuit operative to stop the motor, said electroresponsive switch having connections in the energized position with another of said control switches for energizing the motor to start a limited motoring operation thereof, and said electroresponsive switch having connections in the de-energized position with said one of said control switches for re-energizing the motor to provide a further limited motoring operation thereof, and means including a separate control switch for energizing said electroresponsive switch.

4. A motor control system having in combination an electric driving motor provided with dynamic braking connections closable to stop said motor, means including a control switch operable from one position to another position for energizing the motor, a rotatable element driven by the motor and having first switching means operated thereby for de-energizing the motor after the element is driven through a predetermined angular position when said control switch remains in said other position, and automatic switching means rendered effective upon return of said control switch to said one position and having operating connections with second motor-operated switching means for energizing the motor to drive the element and for de-energizing the motor and closing the dynamic braking connections to stop the motor before the element is driven to the predetermined angular position.

5. A motor control system having in combination an electric motor provided with dynamic braking connections closable to stop said motor, means including an electroresponsive switch effective upon energization thereof for energizing the motor, a rotatable element driven by the motor and having first switching means operated thereby for de-energizing the electroresponsive switch after the element is driven through a predetermined angular position, and second switching means operated by the motor and rendered effective upon the de-energization of the electroresponsive switch for energizing the motor to drive the element and for de-energizing the motor and closing the dynamic braking connections to stop the motor before the element is driven to the predetermined angular position.

6. A motor control system having in combination an electric motor provided with armature and series field windings, a rotatable element driven by the motor and having a plurality of control switches operated thereby, means including a resettable switch and an electroresponsive switch energized thereby and having connections in the energized position thereof with one of said control switches for energizing the armature and series field windings to operate the motor until the rotatable element is driven to a predetermined angular position, means including another of said control switches for de-energizing the electroresponsive switch when the rotatable element is driven to said predetermined angular position and said resettable switch is reset, and connections rendered effective upon the de-energization of the electroresponsive switch under the control of another of said control switches for energizing the armature and series field windings to operate the motor to drive the rotatable element to a second angular position and under control of one of said cntrol switches to interconnect the armature and series field windings in a dynamic braking dircuit to stop the motor when the rotatable element is driven to the second angular position.

7. In combination an electric motor having dynamic braking connections closable to stop the motor, an energy storing mechanism having a rotatable cam driven by the motor for storing energy during a partial revolution of the cam and provided with means for overrunning the motor to release the stored energy when the cam is driven through a dead center position, automatic switching means having operating connections with the cam member for energizing the motor to drive the cam after the cam is driven through the dead center position and for de-energizing the motor and closing the dynamic braking connections to stop the motor before the cam member is returned to the dead center position, and means including a separate control switch for energizing the motor to drive the cam through the dead center position.

8. In combination an electric motor having dynamic braking connections closable to stop the motor, an energy storing mechanism having a rotatable cam driven by the motor for storing energy during one part of each revolution of the cam and provided with means for overrunning the motor to release the stored energy during the other part of each revolution when the cam is driven through a dead center position intermediate to said parts, first switching means including an electroresponsive switch having connections in the energized position for energizing the motor to drive the cam through the dead center position, second switching means operated by the cam and having connections effective only when the electroresponsive switch is in the de-energized position for energizing the motor to drive the cam during said one part of each revolution and for de-energizing the motor and closing the dynamic braking connections to stop the motor before the cam is returned to the dead center position.

9. In combination, a rotatable element, an electric motor arranged to drive said element through a predetermined cycle, a pair of energizing circuits respectively operable to cause said motor to drive said element through initial and intermediate portions of said cycle, a dynamic braking circuit for stopping said motor when said element has moved into the final portion of said cycle, a selective switch movable from one circuit-controlling position to another to render said first energizing circuit operative and returnable to said one circuit-controlling position to permit operation of said second energizing circuit and said braking circuit, separately-controlled means for operating said selective switch into said other circuit-controlling position thereby to drive said element through said initial portion of the cycle, means responsive to movement of said element into said intermediate portion of the cycle to return said selective switch to said one circuit-controlling position, a plurality of control switches collectively movable into a first position for rendering operative said second energizing circuit and into a second position for rendering operative said braking circuit, and coupling means between said rotatable element and said control switches for collectively moving said control switches into said first and second positions respectively in response to movement of said element into said intermediate and final portions of said cycle.

10. In combination, a rotatable element, an electric motor arranged to drive said element, a pair of energizing circuits respectively operable to cause said motor to drive said element from a first to a second angular position and from said second to a third angular position, a dynamic braking circuit for stopping said motor when said element has moved from said third into said first angular position, a selective switch movable from one circuit-controlling position to another to render said first energizing circuit operative and returnable to said one circuit-controlling position to permit operation of said second energizing circuit and said dynamic braking circuit, manually-controlled means for operating said selective switch into said other circuit-controlling position thereby to drive said element from its first to its second angular position, means responsive to movement of said element into its second angular position to return said selective switch to said one circuit-controlling position, a plurality of control switches collectively movable into a first position for rendering operative said second energizing circuit and into a second position for rendering operative said dynamic braking circuit, and coupling means between said rotatable element and said control switches for collectively moving said control switches into said first and second positions respectively in response to movement of said element into said second and third angular positions.

No references cited.